H. R. VAN DEVENTER.
TRIPPING MECHANISM FOR IGNITERS.
APPLICATION FILED MAR. 27, 1915. RENEWED APR. 25, 1917.

1,245,831.

Patented Nov. 6, 1917.
2 SHEETS—SHEET 1.

Witnesses
H. Lowenstein
James H. Marr

Inventor
Harry Randolph Van Deventer
By Edward E. Clement
Attorney

H. R. VAN DEVENTER.
TRIPPING MECHANISM FOR IGNITERS.
APPLICATION FILED MAR. 27, 1915. RENEWED APR. 25, 1917.

1,245,831.

Patented Nov. 6, 1917.
2 SHEETS—SHEET 2.

Inventor
Harry Randolph Van Deventer

Witnesses

By Edward E. Clement
Attorney

UNITED STATES PATENT OFFICE.

HARRY RANDOLPH VAN DEVENTER, OF SUMTER, SOUTH CAROLINA, ASSIGNOR, BY MESNE ASSIGNMENTS, TO SPLITDORF ELECTRICAL COMPANY, OF NEWARK, NEW JERSEY, A CORPORATION OF NEW JERSEY.

TRIPPING MECHANISM FOR IGNITERS.

1,245,831.  Specification of Letters Patent.  Patented Nov. 6, 1917.

Application filed March 27, 1915, Serial No. 17,499. Renewed April 25, 1917. Serial No. 164,526.

*To all whom it may concern:*

Be it known that I, HARRY RANDOLPH VAN DEVENTER, a citizen of the United States, residing at Sumter, in the county of Sumter and State of South Carolina, have invented certain new and useful Improvements in Tripping Mechanism for Igniters, of which the following is a specification, reference being had to the accompanying drawing.

This invention relates to igniter mechanism for internal combustion engines, and has for its object the production of a self-contained apparatus, preferably combining all of the magneto and operating parts with the igniter in one unit, provided with hand operating or starting means, and holding or locking means.

It has heretofore been proposed, as for example in the Patent No. 1,030,243 granted to C. T. Mason, June 18th, 1912, to provide hand operating and latching means for an ignition dynamo, but such devices have required the provision of various separate elements, such as operating means, igniter rods, magneto supports, and the like, which being carried on different supports, and subject to adjustment of various parts of the engine and appurtenances, cannot be combined and adjusted with respect to each other so as to produce full economy and efficiency.

In order to attain my object, I provide a bracket structure connected with the igniter plug, and upon this bracket I mount the magneto with the operating parts, tension springs for the same being connected to posts on side arms extending out from a flange on the plug. Upon one of these posts I also mount a latch; and upon the other one a hand operating device, and I so design and arrange these and the coöperating parts that not only is the apparatus as a whole self-contained, but all parts are adjusted against each other and with respect to each other, and all strains are properly compensated in the unit itself. The only indispensable outside connection is the push rod or equivalent means driven by the engine, and as this only engages the trip lever or operating means of the magneto in its forward stroke, only a single adjustment of this rod with respect to the operating parts is provided for, for purposes of timing. As I shall presently point out, this adjustment can also be placed upon the unit, whereby its absolute and fixed correlation with the operating elements is assured.

My invention is illustrated in the accompanying drawings in which:—

Figure 1:
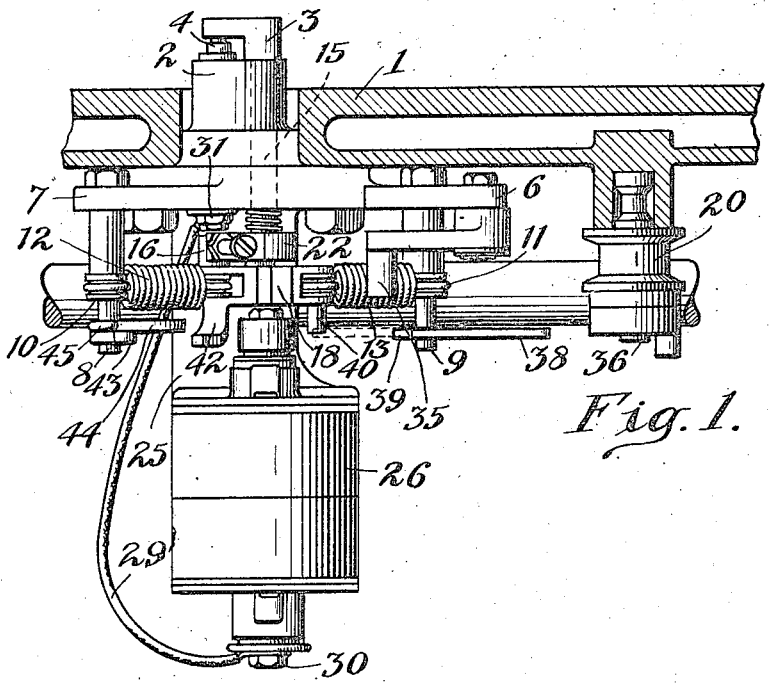
Figure 1 is a plan view showing my invention applied to the cylinder wall of an engine.

Referring to the drawings in particular, 1 denotes a section of the wall of the engine cylinder, to permit the igniter body 2 to be shown. This carries the movable contact 3 and the fixed contact 4 constituting the usual make and break igniter mechanism. A flange 5 projects around the aperture in the cylinder, and projecting from this flange and preferably integral therewith are the arms 6 and 7 supporting studs 8 and 9, carrying rollers 10 and 11, for the ends of springs 12 and 13. The remaining ends of said springs are carried on rollers suitably attached to the trip lever 14, which is loosely mounted on the shaft 15 of the movable electrode 3, it being understood that the shaft forms a support for the trip lever 14 but does not move therewith. Trip lever 14 is provided with an igniter firing finger 16, a bifurcated finger 17, and a trip finger 18, the latter adapted to be engaged by the push rod 19, the outer end of said rod being suitably connected to some moving part of the engine so that the rod has a reciprocating motion over the pulley 20 which causes the inner end 21 of the rod to push inwardly against 18 until same is suddenly released and rides under it. Such a trip motion is now commonly used in connection with make and break igniters.

The shaft 15 of the movable contact 3 of the igniter carries at its outer end an arm 22 having suitable adjusting means such as the screw 23 whereby the relative position of 22 and the firing finger 16 on the trip lever may be adjusted. This is occasioned by the necessity, when some magnetos are used, of having the igniter contacts closed, while again when battery is used it is preferable to have the igniter contacts normally open.

A spring 24 or any other suitable means may be employed to hold the contacts of the igniter together which is accomplished by securing one end of said spring to the flange 5 and the other end at the arm 22.

Projecting from the flange 5 is a support 25 upon which may be mounted any suitable magneto 26, the support 25 together with the members 2, 5, 6 and 7 forming a unit mounting frame preferably integral. Upon the shaft of this magneto is a dog 27, a crank pin 28 on which is positioned between the fingers 17 of a bifurcated trip lever 14. A connection 29 is made between the circuit terminal 30 of the magneto and the binding post 31 on the outer end of the fixed contact 4 of the igniter, this fixed contact being suitably insulated from the igniter body 2 in the usual manner. The circuit is completed through the movable contacts 3 of the igniter, and framework of the igniter mechanism and magneto.

Any suitable type of magneto may be used. Presuming the magneto to be of the alternating current type, the armature or rotor of same is so set in relation to the dog 27 that when the dog is moved to the right, facing Fig. 1, and suddenly released, the peak of the current wave produced by the movement of the armature will occur at the same time the igniter points, in the cylinder, separate. This is accomplished by the push rod 19 engaging trip finger 18, thereby pushing trip lever 14 to the left until 18 trips under the end 21 of rod 19. When this occurs, springs 12 and 13 cause a quick return of the trip lever to its normal or central position, and finger 17 engaging the lower end 28 of the dog 27 causes a corresponding rapid movement of the dog, thereby actuating the magneto. At the proper time, in the cycle of operations the firing finger 16 strikes the lower end of the screw 23, which moves arm 22 rigidly attached to shaft 15 thereby causing a spark at the separation of the igniter contacts in the cylinder.

To prevent the operation of the igniter mechanism during the idle strokes of the engine, the exhaust valve push rod 32 which has a reciprocating motion, is provided with suitable means such as the pin 33 adapted to engage the arm 34 of a bell crank lever, the upper end 35 of which is positioned under push rod 19, so that when the exhaust rod is actuated, which occurs during the idle stroke of the piston on "hit-and-miss" engines, or when the exhaust valve is held open by the governor, the bell crank lever will occupy the position shown in dotted lines, thereby lifting the push rod 19 above finger 18, which prevents the operation of the igniter mechanism, the rod 19 reciprocating idly above finger 18 without engaging same.

I also provide a shaft 36 upon which pulley 20 is eccentrically mounted. Moving the arm 37 to the right or left (facing Fig. 2), the end 21 of push rod 19 is raised or lowered in its relation to finger 18, thereby varying the time of ignition.

If desired, the magneto may be removed by merely unbolting it from the support 25, and simultaneously removing the wire 29 from the binding post 31. Any other suitable source of current may then be connected to post 31 and the engine may be operated without the magneto, as the parts that operate the igniter, and which coact as between the same and the engine, are not disturbed.

From the foregoing it will be obvious that the igniter mechanism only without the magneto is operated; and furthermore that the said igniter mechanism alone may be actuated by hand as hereinafter described, and while I disclose this arrangement it will be understood that the same is claimed in another application.

For the purpose of operating the magneto by hand a lever 38 is provided pivoted on the stationary post 9 and adapted to be swung around its pivot, in operation, by means of a handle 39. The lever 38 is of such length as to engage the stud 40 and raise it into the position indicated in dotted lines (Fig. 2) under which condition, the lever also assumes the position indicated in dotted lines. In raising the stud 40 into the dotted line position, the trip lever 14 is swung into its maximum operating or cocked position. In order to hold the trip lever in the cocked position, an extension 42 is provided to be carried by the trip lever and so arranged in fixed relation thereto as to engage a trigger 43 when the trip lever is swung into the cocked position. The trigger 43 is pivotally mounted on the post 8, biased by a weight 44 adapted to be operated or rotated against the bias of the weight by means of a suitable handle 45. It is obvious from the foregoing that, under normal conditions, when the lever 38 is rotated clockwise through approximately 270 degrees the trip lever will be thrown into cocked position and automatically latched there through engagement of the end of the extension 42 with the trigger 43. With the igniter mechanism latched in the cocked position as described, all that is necessary in order to start the engine is to turn the same into the power stroke and release the trigger 43 by operation of the handle 45 whereupon the ignition mechanism is actuated under force of the operating springs 12—13 to ignite the charge all in a manner as previously set forth. As soon as the engine has been started, the handle 45 is placed in a substantially horizontal position thereby raising the trigger 43 out of engaging relation with the trip lever extension 42, in which position the trigger will become biased by the weight 44, the weight being moved to the left of the vertical above the pivot.

Figure 2:
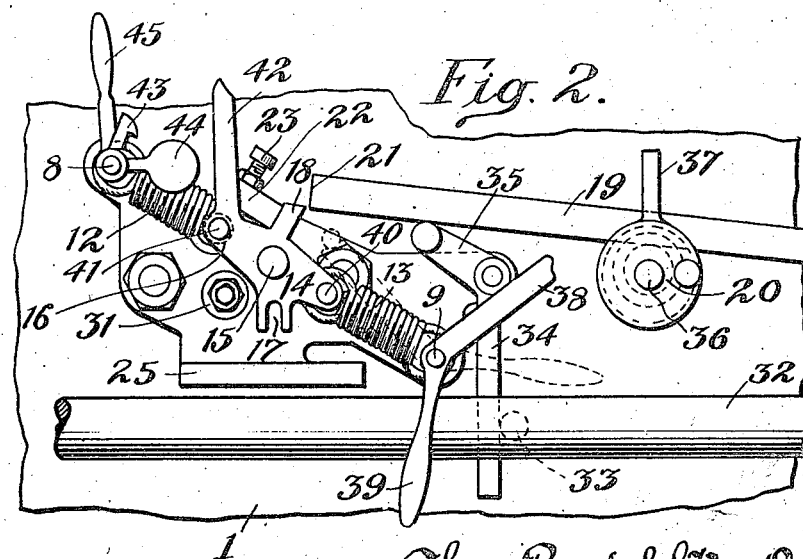
Fig. 2 is a front view thereof with the magneto removed.

To stop the engine it is only necessary to place the trigger back in the position indicated in Fig. 2 whereupon the next throw of the trip lever into cocked position by the normal operation of the push rod will cause it to become latched in that position and stop the engine, leaving the ignition mechanism set in readiness for again starting the engine by releasing the trigger.

It is further to be noted that in initially starting the engine with the igniter parts in the normal or uncocked position, the trigger 43 may be disabled as previously pointed out and the trip lever 14 thrown into its extreme operated position and then released or tripped by continued rotation of the lever 38 in a clockwise direction after its engagement with the stud 40. This operation will of course have the same effect as any of the other operations previously described and so result in starting the engine.

Figure 3:
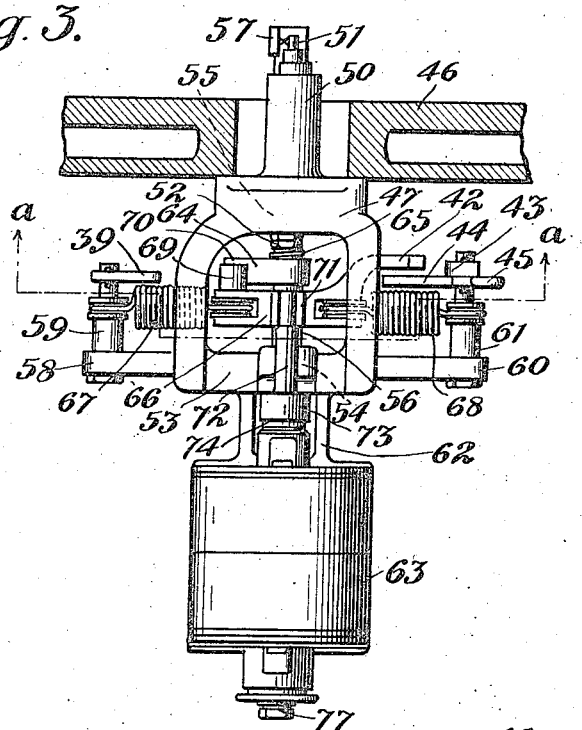
Fig. 3 is a plan view of a modification.
Figure 4:
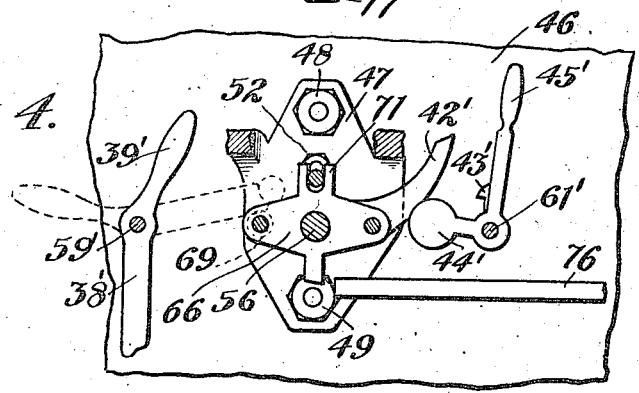
Fig. 4 is a vertical section thereof taken on the line *a—a* of Fig. 3.

Referring now to Figs. 3 and 4, I have herein shown my invention embodied in an ignition unit of a different structure, the operation however being substantially the same.

In this modification 46 is the engine cylinder on which is mounted the main frame body 47 of the ignition unit by means of the mounting bolts 48—49. (Fig. 4.) The main frame body carries the igniter body 3 which extends into the ignition chamber of the engine and carries mounted on its end the fixed electrode 4 of the igniter which electrode is electrically connected with the binding post 52 carried on the outer face of the main frame body 47. An outward extension 53 of the frame carries a bearing 54 positioned in alinement with a bearing 55 in the main frame body 47. These two bearings support the igniter operating shaft 56 which extends from the bearing 54 inwardly through the igniter body into the ignition chamber where it carries the movable electrode 57 of the igniter. The outer extension 53 carries a pair of spring holding arms consisting of the extension 58 and post 54 on one side, and extension 60 and post 61 on the other side. A bracket 62 extends outwardly from, and below, the extended portion 53 for the purpose of mounting the magneto 63 in proper position relative to the other parts. Circuit connection may be made in a manner as shown in Fig. 1, from the magneto binding post 77 to the igniter binding post 52, the return circuit being by way of ground or frame. The igniter operating shaft 56 carries an operating lever 64 fixed thereto and both held normally in a given position relative to the frame by means of a torsion spring 65 connected between the lever 64 and the main frame body 47. The trip lever 66 is journaled on the igniter operating shaft and held under tension in a given position relative to the frame by means of the pull springs 67 and 68 each connected at one end to the trip lever through a pulley or roller bearing, and at the other end to one of the posts 59 and 61 through a roller bearing, as is clearly shown in Fig. 3. Motion is transmitted from the trip lever to the igniter operating arm 64 by means of a stud 69 projecting from the trip lever across the igniter operating lever and acting on it through an adjustable tappet in the form of a screw and locknut 70, similar to the tappet 23 in Fig. 2. Motion is transmitted from the trip lever to the magneto shaft by means of the upwardly extending bifurcated finger 71 on the trip lever, and the crank pin 72 straddled at one end by the bifurcated finger and connected at the other end to a crank 73 carried by the magneto shaft 74. For operating the trip lever 66 a trip finger 75 is provided extending downwardly from the trip lever into the path of a reciprocating trip rod 76 and clear of the various other parts of the ignition unit. The operation of the trip lever and consequently the igniter and magneto, by the trip rod 76 is in all respects similar to that described for Figs. 1 and 2.

In applying the cocking and release mechanism to the structure just described, the cocking lever 38' is pivoted to the post 59 and in the same fixed relation to the stud 69 on the trip lever 66 as is the lever 38 of Fig. 2 to the stud 40. Similarly the trigger 43' is pivotally mounted on the post 8 in the same relation to the extension 42' or the trip lever 66 as are the corresponding members 43 and 42 of Fig. 2. The cocking mechanism applied as shown in Figs. 3 and 4 operates in substantially the same manner as that further set out in connection with Figs. 1 and 2 and is thought to be sufficiently obvious to be understood without further detailed description.

While I have herein described and illustrated in detail the preferred embodiment of my invention, it is to be understood that various other modifications may be made without departing from the spirit of the invention, which modifications are contemplated by me.

Having thus described my invention, what I claim and desire to secure by Letters Patent is:—

1. Ignition mechanism for an internal combustion engine comprising a frame adapted to be mounted on the engine, an igniter carried by the frame so as to extend into the ignition chamber of the engine, a trip lever for actuating said igniter, tension means extending between the frame and trip lever tending normally to maintain the trip lever in a given position, manually actuated means carried by the frame for moving the trip lever against the force of said tension means to cocked position and automatically releasing the same, means carried by the frame for holding the trip lever in cocked position against the force of said tension means, manually operated means carried by the frame for releasing the trip lever, all in combination with a magneto removably supported on said frame and detachable connecting means between the rotor of said magneto and said trip lever.

2. Ignition mechanism for an internal combustion engine comprising a frame adapted to be mounted on the engine, an igniter carried by the frame so as to extend into the ignition chamber of the engine, a trip lever for actuating said igniter, tension means extending between the frame and trip lever tending normally to maintain the trip lever in a given position, means operated by the engine for moving the trip lever against the force of said tension means to cocked position and automatically releasing the same, manually actuated means carried by the frame for moving the trip lever to cocked position and automatically releasing the same, means carried by the frame for holding the trip lever in cocked position against the force of the tension means, manually actuated means carried by the frame for releasing the trip lever, means carried by the frame for disabling said holding means, all in combination with a magneto removably supported on said frame and detachable connecting means between the rotor of said magneto and said trip lever.

3. Ignition mechanism for an internal combustion engine comprising a frame adapted to be mounted on the engine, an igniter carried by the frame so as to extend into the ignition chamber of the engine, a trip lever for actuating said igniter, tension means extending between the frame and trip lever tending normally to maintain the trip lever in a given position, means operated by the engine for moving the trip lever against the force of said tension means to cocked position and automatically releasing the same, means carried by the frame for holding the trip lever in cocked position against the force of the tension means, manually actuated means carried by the frame for releasing the trip lever, means carried by the frame for disabling the said holding means, all in combination with a magneto removably supported on said frame and detachable connecting means between the rotor of said magneto and said trip lever.

4. Ignition mechanism for an internal combustion engine comprising a frame adapted to be mounted on the engine, an igniter carried by the frame so as to extend into the ignition chamber of the engine, a trip lever for actuating said igniter, tension means extending between the frame and trip lever tending normally to maintain the trip lever in a given position, means operated by the engine for moving the trip lever against the force of said tension means to cocked position and automatically releasing the same, means carried by the frame for timing the release of the trip lever, manually actuated means carried by the frame for moving the trip lever to cocked position and automatically releasing the same, means carried by the frame for holding the trip lever in cocked position against the force of the tension means, normally actuated means carried by the frame for releasing the trip lever, means carried by the frame for disabling said holding means, all in combination with a magneto removably supported on said frame and detachable connecting means between the rotor of said magneto and said trip lever.

5. Ignition mechanism for an internal combustion engine, comprising a frame adapted to be mounted on the engine, an igniter carried by the frame so as to extend into the ignition chamber of the engine, a trip lever for actuating said igniter, tension means extending between the frame and trip lever tending normally to maintain the trip lever in a given position, means operated by the engine for moving the trip lever against the force of said tension means to cocked position and automatically releasing the same, manually actuated means carried by the frame for moving the trip lever to cocked position and automatically releasing the same, trigger mechanism pivoted on the frame for automatically catching and holding the trip lever in cocked position after the movement of the trip lever to said position and releasing it at will, means for disabling said trigger, all in combination with a magneto removably supported on said frame and detachable connecting means between the rotor of said magneto and said trip lever.

6. Ignition mechanism for an internal combustion engine comprising a frame adapted to be mounted on the engine, an igniter carried by the frame so as to extend into the ignition chamber of the engine, a trip lever for actuating said igniter, tension means extending between the frame and trip lever tending normally to maintain the trip lever in a given position, engine actuated means and manually actuated means carried by the frame for moving the trip lever against the force of said tension to cocked position and automatically releasing the same, trigger mechanism pivoted on the frame for automatically catching and holding the trip lever in cocked position upon its movement into said position and releasing it at will, means for disabling said trigger mechanism, all in combination with a magneto removably supported on said frame and detachable connecting means between the rotor of said magneto and said trip lever.

In testimony whereof I hereunto affix my signature in the presence of two witnesses.

HARRY RANDOLPH VAN DEVENTER.

Witnesses:
E. H. RHAME,
EDNA B. ISLER.